US009500232B2

(12) United States Patent
Ishii

(10) Patent No.: US 9,500,232 B2
(45) Date of Patent: Nov. 22, 2016

(54) BALL BEARING

(71) Applicant: JTEKT CORPORATION, Osaka-shi, Osaka (JP)

(72) Inventor: Yasuhiko Ishii, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/794,071

(22) Filed: Jul. 8, 2015

(65) Prior Publication Data
US 2016/0017923 A1 Jan. 21, 2016

(30) Foreign Application Priority Data
Jul. 16, 2014 (JP) .................... 2014-145849

(51) Int. Cl.
| F16C 33/38 | (2006.01) |
| F16C 33/66 | (2006.01) |
| F16C 19/06 | (2006.01) |
| F16C 33/78 | (2006.01) |
| F16C 19/16 | (2006.01) |
| F16C 33/58 | (2006.01) |

(52) U.S. Cl.
CPC ........... F16C 33/6629 (2013.01); F16C 19/06 (2013.01); F16C 33/7846 (2013.01); *F16C 19/163* (2013.01); *F16C 33/586* (2013.01)

(58) Field of Classification Search
CPC F16C 19/163; F16C 19/166; F16C 33/6614; F16C 33/6629; F16C 33/6681

USPC .................................. 384/470, 523
See application file for complete search history.

(56) References Cited

U.S. PATENT DOCUMENTS

| 3,096,129 A * | 7/1963 | Hay ..................... F16C 19/14 384/470 |
| 3,161,448 A * | 12/1964 | Moran ................ F16C 33/6614 384/462 |
| 3,674,356 A * | 7/1972 | Zeneski ............. F16C 33/3856 384/470 |
| 2011/0280510 A1* | 11/2011 | Hamada ............. F16C 33/3856 384/523 |
| 2012/0008891 A1* | 1/2012 | Mitchell ............. F16C 19/163 384/523 |

FOREIGN PATENT DOCUMENTS

JP 2010-164122 A 7/2010

* cited by examiner

Primary Examiner — Phillip A Johnson
(74) Attorney, Agent, or Firm — Oliff PLC

(57) ABSTRACT

A ball bearing includes: an inner ring having an inner ring raceway surface on its outer circumference; an outer ring having an outer ring raceway surface on its inner circumference; a plurality of balls are disposed between the inner and outer ring raceway surfaces; and a cage. In the outer circumference of the inner ring, an inner ring shoulder portion is provided on a first axial side of the inner ring and a counter bore is provided on a second axial side of the inner ring. A tapered surface extending radially outward toward the ball is formed in a portion that is in a circumferential wall of each pocket hole, and that is in an end on a first axial side of the cage.

2 Claims, 2 Drawing Sheets

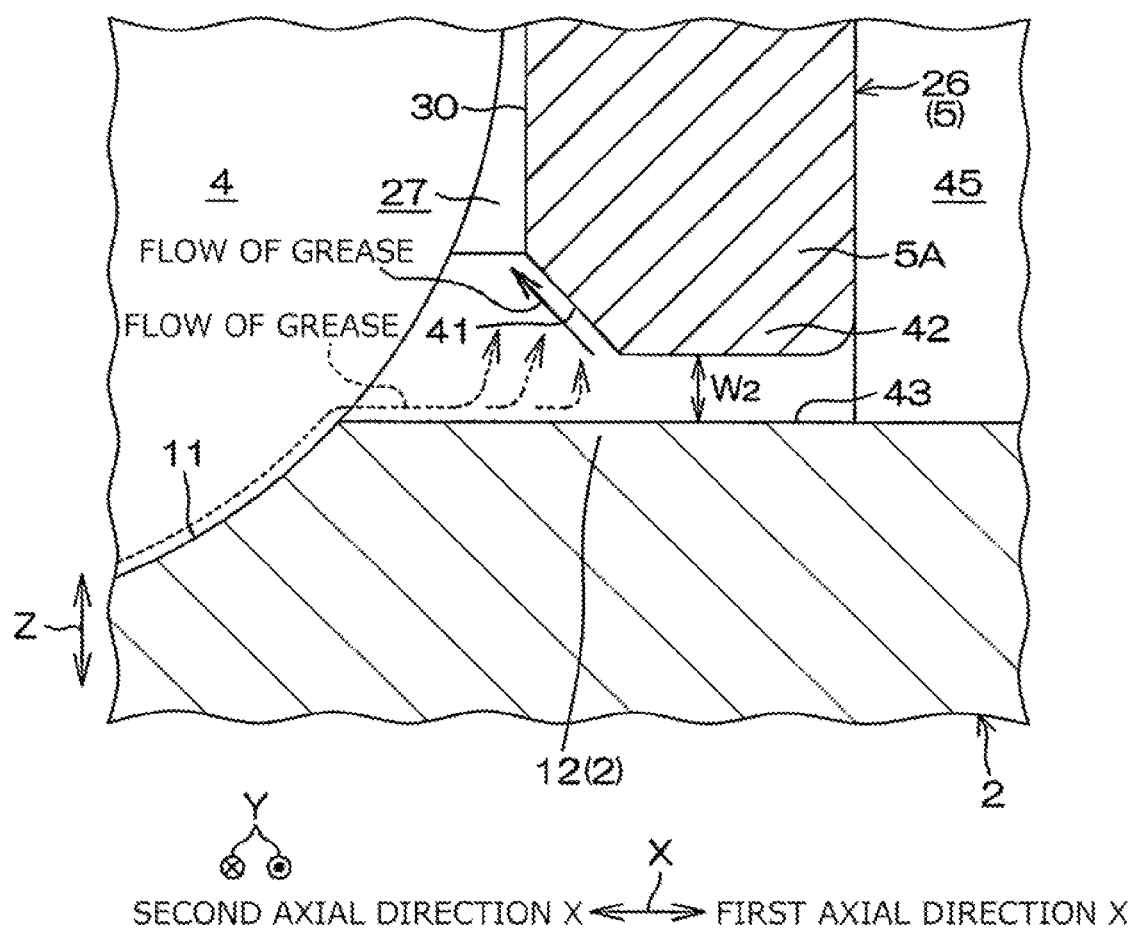

US 9,500,232 B2

BALL BEARING

INCORPORATION BY REFERENCE

The disclosure of Japanese Patent Application No. 2014-145849 filed on Jul. 16, 2014 including the specification, drawings and abstract, is incorporated herein by reference in its entirety.

BACKGROUND OF THE INVENTION

1. Field of the Invention

The invention relates to a grease lubricated ball bearing.

2. Description of Related Art

Grease lubrication has been widely used in the prior art as a method for lubricating a ball bearing. For example, Japanese Patent Application Publication No. 2010-164122 (JP 2010-164122 A) has been proposed for a grease lubricated ball bearing. JP 2010-164122 A discloses a grease lubricated high-speed rotation ball bearing including a plurality of balls, and a circular ring-shaped cage. The balls are interposed between an inner ring and an outer ring. The cage holds the balls at predetermined intervals along a circumferential direction. In such ball bearing, an inner ring shoulder portion is provided on a first axial side of the outer circumference of the inner ring, and a counter bore is provided on a second axial side of the outer circumference of the inner ring. In JP 2010-164122 A, the entire region of the inner circumference of the cage is configured by a cylindrical surface.

An outside diameter of the inner ring in JP 2010-164122 A is smaller at the second axial side than the first axial side. Thus, when the inner ring is rotating, grease flows from the second axial side toward the first axial side in the outer circumference of the inner ring due to a difference in centrifugal force acting between the first axial side and the second axial side in the outer circumference of the inner ring and adhering of the grease in the inner ring. The grease applied to a portion near the outer circumference of the inner ring moves from the second axial side toward the first axial side with such flow. Such grease is desirably guided to the inner circumference of the outer ring, and then, supplied to an outer ring raceway surface.

However, in JP 2010-164122 A, the grease moving from the second axial side toward the first axial side passes between the inner circumferential surface of the cage and the outer circumferential surface of the inner ring, moves to a space located near a first axial side of the cage between the inner and outer rings, and accumulated therein. Therefore, the amount of grease used for grease lubrication between the outer ring raceway surface and the surface of the ball reduces, which may result in poor lubrication.

SUMMARY OF THE INVENTION

An object of the present invention is to provide a ball bearing capable of providing a satisfactory grease lubrication between an outer ring raceway surface and the outer circumferential surfaces of balls.

According to an aspect of the present invention, a ball bearing includes: an inner ring having an inner ring raceway surface on its outer circumference; an outer ring having an outer ring raceway surface on its inner circumference; a plurality of balls disposed between the inner and outer ring raceway surfaces; and a cage that includes a plurality of pocket holes accommodating the balls, and that is disposed between the inner ring and the outer ring, in which grease is filled between the inner ring and the outer ring, in the outer circumference of the inner ring, an inner ring shoulder portion is provided on a first axial side of the inner ring and a counter bore is provided on a second axial side of the inner ring, and a tapered surface extending outward in a radial direction of the cage toward the ball is formed in a portion that is in an inner circumferential end of a circumferential wall of each pocket hole and that is in an end on a first axial side of the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is an enlarged view of a periphery of a tapered surface of FIG. 1.

DETAILED DESCRIPTION OF EMBODIMENTS

Figure 1:
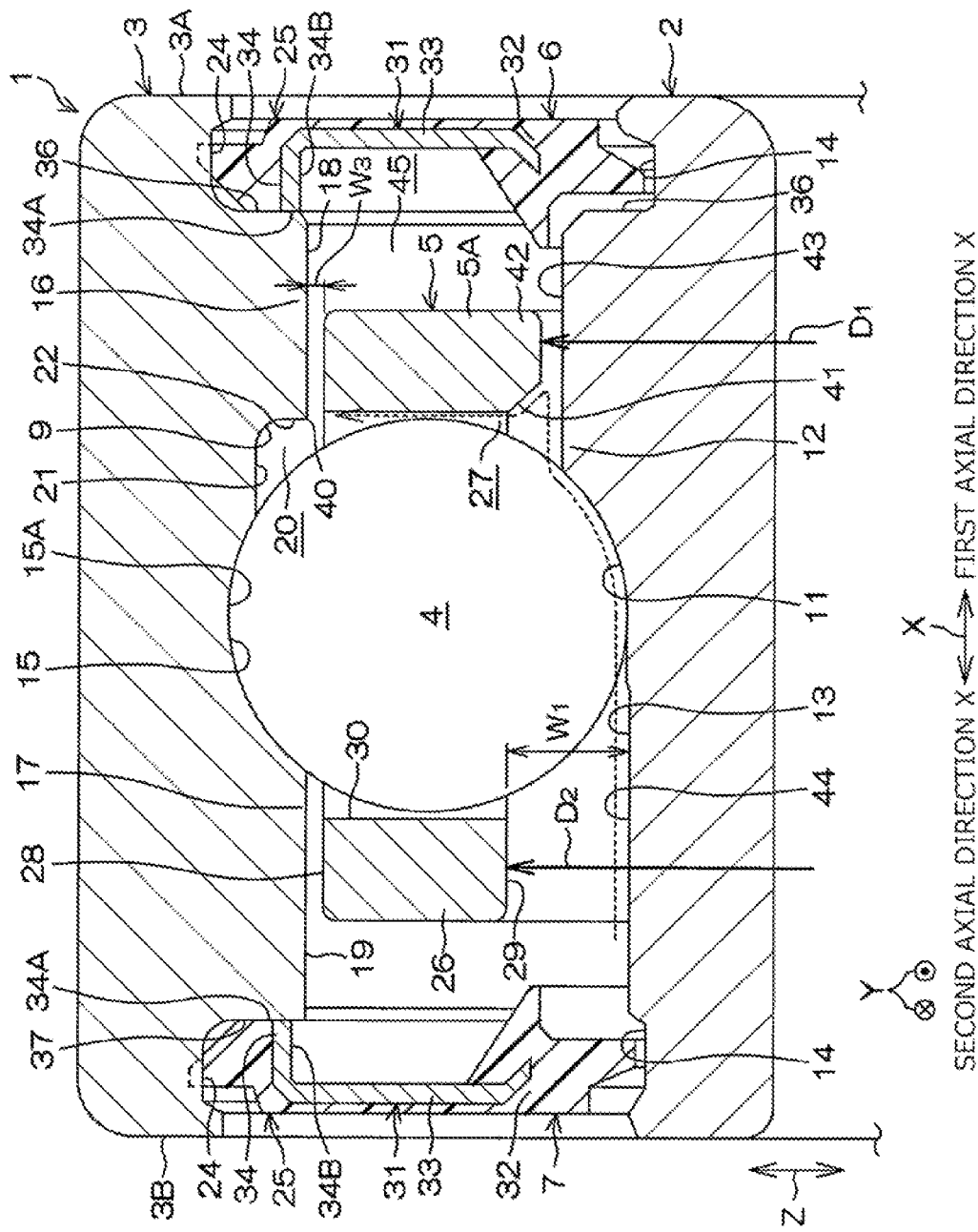
FIG. 1 is a cross-sectional view of a ball bearing according to an embodiment of the present invention.

An embodiment of the present invention will be hereinafter described in detail with reference to the accompanying drawings.

FIG. 1 is a cross-sectional view of a ball bearing 1 according to an embodiment of the present invention. FIG. 2 is an enlarged view of a periphery of a tapered surface 41 of FIG. 1. The ball bearing 1 is, for example, a high-speed rotation ball bearing that supports a rotary shaft (not shown) of a machine tool (not shown). Other than the machine tool, the ball bearing 1 is also used as a ball bearing that supports a turbine rotary shaft of a compressor, a pump, and the like.

The ball bearing 1 is, for example, an angular contact ball bearing. The ball bearing 1 includes an inner ring 2, an outer ring 3, a plurality of balls 4, a cylindrical cage 5, a first seal 6, and a second seal 7. The inner ring 2 is fitted on and fixed to the rotary shaft. The outer ring 3 is fitted in and fixed to a housing (not shown) of the machine tool. The balls 4 are arranged between an inner ring raceway surface 11 of the inner ring 2 and an outer ring raceway surface 15 of the outer ring 3. The cage 5 includes pockets that hold the respective balls 4 at constant intervals in the circumferential direction. The first seal 6 is disposed at a first axial end (the right end in FIG. 1) of an annular space between the inner ring 2 and the outer ring 3. The second seal 7 is disposed at a second axial end (the left end in FIG. 1) of the annular space between the inner ring 2 and the outer ring 3. In the ball bearing 1, the grease lubrication is provided.

In the following description, an axial direction X refers to the axial direction of the rotary shaft (not shown). The axial direction of the outer ring 3 and the axial direction of the cage 5 coincide with the axial direction X. For the sake of convenience, in the axial direction X, a first axial direction refers to an axial direction (direction toward the right in FIG. 1) toward a side on which a rolling element load acts (side on which a contact angle is formed) in the inner ring raceway surface 11 (contact point). In the axial direction X, a second axial direction refers to an axial direction (direction toward the left in FIG. 1) toward a side on which the rolling element load acts (side on which a contact angle is formed) in the outer ring raceway surface 15 (contact point) in the axial direction X. A radial direction Z refers to a radial direction of the ball bearing 1. A radial direction of the outer ring 3 coincides with the radial direction Z. An "inner side" refers to a side adjacent to the rotary shaft (not shown) in the radial direction Z. An "outer side" refers to a side remote from the rotary shaft (not shown) in the radial direction Z. Moreover, a circumferential direction Y refers to the circumferential direction of the ball bearing 1.

The inner ring 2 is integrally rotatable with the rotary shaft. The inner ring raceway surface 11, on which the ball 4 rolls, is formed on the outer circumference of the inner ring 2 at a central part in the axial direction X. The inner ring raceway surface 11 is formed such that the contact angle of the inner ring raceway surface 11 and the ball 4 is a predefined angle. An inner ring shoulder portion 12 is formed on a first axial direction X side (the right in FIG. 1) of the outer circumference of the inner ring 2. A counter bore 13 (stepped portion) is provided on a second axial direction X side (the left in FIG. 1 of the outer circumference of the inner ring 2, which is on the opposite side of the side on which the contact angle is formed (the first axial direction X side, the right in FIG. 1). A first seal groove 14 recessed inward in the radial direction Z is formed at both ends of the outer circumference of the inner ring 2 in the axial direction X.

The outer ring 3 is fixedly provided in the housing (not shown). The outer ring raceway surface 15, on which the ball 4 rolls, is formed in the inner circumference of the outer ring 3 at a central part in the axial direction X. The outer ring raceway surface 15 is formed such that the contact angle of the outer ring raceway surface 15 and the ball 4 is a predefined angle. First and second outer ring shoulder portions 16, 17 are formed at portions in the inner circumference of the outer ring 3, which are other than the outer ring raceway surface 15, such that the outer ring raceway surface 15 is interposed between the first and second outer ring shoulder portions 16, 17 in the axial direction X. The inner circumferences of the first and second outer ring shoulder portions 16, 17 have inner circumferential surfaces 18, 19, respectively, which are cylindrical surfaces having the same diameter. In other words, the inner circumferential surface 18 and the inner circumferential surface 19 are cylindrical surfaces that are flush with each other.

A grease accumulating groove 20 that accumulates grease (not shown) is formed adjacent to the outer ring raceway surface 15 on the first axial direction X side (the right in FIG. 1) (i.e., between the outer ring raceway surface 15 and the first outer ring shoulder portion 16), in the inner circumference of the outer ring 3. The grease accumulating groove 20 is a groove having a substantially L-shaped cross-section and defined by a cylindrical wall 21 extending about the axial direction X, a perpendicular wall 22 extending along the radial direction Z, and a curved wall 9 connecting the cylindrical wall 21 and the perpendicular wall 22. The cylindrical wall 21 is continuous with the outer ring raceway surface 15. The cylindrical wall 21 serving as the bottom surface of the grease accumulating groove 20 is located inward in the radial direction Z from a deepest portion 15A (bottom portion at a central position of the outer ring raceway surface 15 in the axial direction X) of the outer ring raceway surface 15. In other words, the bottom portion of the grease accumulating groove 20 is located inward in the radial direction Z from the deepest portion 15A of the outer ring raceway surface 15. The bottom portion of the grease accumulating groove 20 is defined by the cylindrical wall 21 instead of a tapered surface, and the like. Thus, the overriding of the ball 4 onto the bottom portion of the grease accumulating groove 20 thus can be effectively suppressed. Furthermore, the bottom portion of the grease accumulating groove 20 is located inward in the radial direction of the outer ring 3 from the deepest portion 15A of the outer ring raceway surface 15. The overriding of the ball onto the bottom portion of the grease accumulating groove 20 thus can be effectively suppressed.

The perpendicular wall 22 is continuous with the inner circumferential surface 18. The length of the cylindrical wall 21 in the axial direction X is longer than that of the perpendicular wall 22 in the radial direction Z. In other words, the length of the perpendicular wall 22 in the radial direction Z is shorter than the length of the cylindrical wall 21 in the axial direction X. Therefore, it is possible to maintain the grease accumulating groove 20 at a large capacity without deepening the grease accumulating groove 20 outward in the radial direction Z. The overriding of the ball 4 onto the bottom portion of the grease accumulating groove 20 thus can be more effectively suppressed.

Second seal grooves 24 are formed in both ends of the inner circumference of the outer ring 3 in the axial direction X. The second seal groove 24 located on the first axial direction X side (the right in FIG. 1) is provided by forming a first step portion 36, which connects the inner circumferential surface 18 and a first side end face 3A of the outer ring 3, on the inner circumferential surface 18 of the first outer ring shoulder portion 16. The first step portion 36 is a plane perpendicular to the inner circumferential surface 18. The second seal groove 24 located on the second axial direction X side (the left in FIG. 1) is provided by forming a second step portion 37, which connects the inner circumferential surface 19 and a second side end face 3B of the outer ring 3, on the inner circumferential surface 19 of the first outer ring shoulder portion 17. The second step portion 37 is a plane perpendicular to the inner circumferential surface 19. Each second seal groove 24 is fitted to an outer circumferential portion 25 of the corresponding seal (first or second seal 6, 7).

The cage 5 includes a cage body 26 having a circular ring plate shape. The cage body 26 has a plurality of pocket holes 27. The pocket holes are formed so as to be lined at equal intervals in the circumferential direction Y. The pocket holes 27 extend through the cage body 26 in the radial direction Z. The cage 5 is disposed such that the cage body 26 is coaxial with the inner ring 2. The ball 4 is disposed in each pocket hole 27 of the cage 5. In the ball bearing 1, an outer ring riding method is adopted for the method of riding the cage 5. In the method, the outside diameter of the cage 5 rides by causing the inner circumference of the outer ring 3 (i.e., inner circumferential surfaces 18, 19 of the first and second outer ring shoulder portions 16, 17) to slidingly contact an outer circumferential surface 28 of the cage 5. Thus, the behavior of the cage 5 during the rotation of the ball bearing 1 can be stabilized.

Each pocket hole 27 is defined by a circumferential wall 30 forming a cylindrical surface. As described above, the posture of the cage 5 is stabilized by sliding contact with the inner circumference of the outer ring 3.

When the cage 5 is accommodated in the ball bearing 1, a first axial direction X-side end (the right side in FIG. 1) of the circumferential wall 30 of the pocket hole 27 of the cage 5 is substantially aligned (slightly shifted to the first axial direction X side) with the perpendicular wall 22 of the grease accumulating groove 20 in the axial direction X. In other words, a first axial direction X-side end edge 40 of the grease accumulating groove 20 is substantially aligned (slightly shifted to the outer ring raceway surface 15) with the first axial direction X-side end of the circumferential wall 30 of the pocket hole 27 of the cage 5 in the axial direction X. As described above, the inner circumferential surface 18 of the first outer ring shoulder portion 16 is flush with the inner circumferential surface 19 of the first outer ring shoulder portion 17, and the inner circumferential surfaces 18, 19 are cylindrical surfaces (regions in the inner circumference of the outer ring 3, which are other than the grease accumulating groove 20 are cylindrical surfaces). Thus, the entire first axial direction X-side portion of the outer circumferential surface 28 of the cage 5 rides on the inner circumference of the outer ring.

A protrusion 42 that projects inward in the radial direction Z is provided on the inner circumferential surface 29 of the cage 5 on the first axial direction X side (the right side in FIG. 1) with respect to the pocket hole 27. Thus, a bore diameter $D_1$ of an end 5A on the first axial direction X side is smaller than a bore diameter $D_2$ of the portion excluding the end SA. In other words, in the cage 5, the bore diameter $D_1$ on the first axial direction X side is smaller than the bore diameter $D_2$ on the second axial direction X side.

In the cage 5, the tapered surface 41 having a linear cross-section is formed in a portion that is in an inner circumferential end of the circumferential wall 30 of the pocket hole 27 and that is in an end on the first axial direction X side. The tapered surface 41 is formed so as to extend outward in the radial direction Z of the cage 5 toward the ball 4 (i.e., toward the second axial direction X side). As will be described later, the tapered surface 41 functions so as to guide the grease attached to the inner circumferential surface 29 of the cage 5 to the interior of the pocket hole 27.

In the cage 5, the bore diameter $D_1$ in the first axial direction X side is smaller than the bore diameter $D_2$ in the second axial direction X side, and thus the tapered surface 41 does not serve as an undercut. The cage 5, which is a molded product, thus can be easily released from a die (not shown). Therefore, the tapered surface 41 can be formed in the circumferential wall 30 of the cage 5 without carrying out an undercut processing.

The bore diameter $D_1$ of the end 5A of the cage 5 on the first axial direction X side is smaller than the bore diameter $D_2$ of the remaining portion of the cage 5. Thus, when the cage 5 is accommodated in a space between the inner and outer rings 2, 3, an interval $W_2$ (see FIG. 2) between the inner circumferential surface of the end 5A of the cage 5 (inner circumferential surface of the protrusion 42) and the outer circumferential surface 43 of the inner ring shoulder portion 12 of the inner ring 2 is set to be narrow. Specifically, the dimension of the interval $W_2$ is so as to satisfy the following inequalities: $W_3<W_2<W_1$, where $W_1$ is the interval between the inner circumferential surface 29 of the cage 5 in the remaining portion and the outer circumferential surface 44 of the inner ring 2 in the counter bore 13, and $W_3$ is a gap between the outer circumferential surface 28 of the cage 5 and the inner circumferential surface 18, 19 of the outer ring 3.

The pair of seals 6, 7 seal an annular space between the inner ring 2 and the outer ring 3 and prevent the grease from scattering from the annular space. The seals 6, 7 have the same specifications. In the present embodiment, each seal 6, 7 is a noncontact seal having a circular ring shape, but may be a contact seal. Each seal 6, 7 includes a core 31 made of steel plate having a circular ring shape, and a seal body 32. The seal body 32 is made from using rubber or resin, and the core 31 is embedded therein. The core 31 includes an annular plate 33 and a thin cylindrical portion 34. The annular plate 33 is disposed so as to extend along the radial direction Z. The cylindrical portion 34 extends from the outer circumferential edge of the annular plate 33 along the axial direction X. The inward portion of the annular plate 33 in the radial direction Z is slightly bent so as to extend in the axial direction X toward the axial center of the bearing 1. When each of the seals 6, 7 is attached to the inner ring 2 and the outer ring 3, the outer circumferential portion 25 thereof (outer circumferential portion of the seal body 32) is fitted in the second seal groove 24 of the outer ring 3. A distal end edge 34A of the cylindrical portion 34 of each core bar 31 abuts on the corresponding step portion 36, 37. In such mounted state, an inner circumferential surface 34B of each cylindrical portion 34 is substantially flush with the corresponding inner circumferential surface 18, 19.

Since the distal end edge 34A of the cylindrical portion 34 of each core bar 31 thus abuts on the corresponding step portion 36, 37, the grease is prevented from entering the corresponding second seal groove 24. Thus, the accumulation of the grease in the second seal groove 24 can be prevented. The amount of grease to be used for the grease lubrication thus can be increased. Furthermore, in the embodiment, since the inner circumferential surface 34B of each cylindrical portion 34 is substantially flush with the corresponding inner circumferential surface 18, 19, the accumulation of the grease in the corresponding second seal groove 24 can be more reliably prevented. As a result, the amount of grease to be used for the grease lubrication can be further increased.

As described above, the inner ring shoulder portion 12 is provided on the first axial direction X side (the right in FIG. 1) of the outer circumference of the inner ring 2. The counter bore 13 (stepped portion) is provided on the second axial direction X side (the left in FIG. 1) of the outer circumference of the inner ring 2. In other words, the outside diameter of the inner ring 2 is smaller on the second axial direction X side (the left in FIG. 1) than the first axial direction X side (the right in FIG. 1). Therefore, when the inner ring 2 is rotating, the grease flows from the second axial direction X side toward the first axial direction X side in the outer circumference of the inner ring 2 due to the difference in the centrifugal force acting between the first axial direction X side and the second axial direction X side of the outer circumference of the inner ring 2 (pump action). Thus, the grease provided near the outer circumference of the inner ring 2 moves from the) second axial direction X side toward the first axial direction X side. In other words, as shown by dashed lines in FIGS. 1 and 2, part of the grease provided closer to the second axial direction X side with respect to the ball 4 passes through a portion between the inner ring raceway surface 11 and the surface of the ball 4, moves to the first axial direction X side with respect to the ball 4, and thereafter, scatters outward in the radial direction Z by receiving the centrifugal force generated by the rotation of the inner ring 2.

As described above, the bore diameter $D_1$ of the end 5A on the first axial direction X side is smaller than the bore diameter $D_2$ of the remaining portions of the cage 5. Thus, the grease flowing from the second axial direction X side toward the first axial direction X side in the outer circumference of the inner ring 2 hits the protrusion 42 (i.e., tapered surface 41) at the end 5A of the cage 5. The centrifugal force acts in an outward portion of the tapered surface 41 in the radial direction Z is larger than an inward portion of the tapered surface 41 in the radial direction Z. Thus, the grease that hits the tapered surface 41 is drawn to a radially outward side (i.e., in the direction toward the pocket hole 27) of the cage 5 along the tapered surface 41, as shown with the continuous line arrow in FIG. 2. Therefore, the grease that hits the tapered surface 41 can be smoothly supplied to the inside of the pocket hole 27 of the cage 5.

The grease in the pocket hole 27 moves from an inner end (lower end in FIG. 1) of the cage 5 in the radial direction Z to an outer end (upper end in FIG. 1) of the cage 5 in the radial direction Z along the first axial direction X -side end of the circumferential wall 30 of the pocket hole 27 upon receiving the centrifugal force generated by the rotation of the cage 5. The grease that has reached an outer end of the circumferential wall 30 of the pocket hole 27 in the radial direction Z is scattered outward in the radial direction Z upon receiving the centrifugal force generated by the rotation of the cage 5.

As described above, the first axial direction X-side end of the circumferential wall 30 of the pocket hole 27 of the cage 5 is substantially aligned with the perpendicular wall 22 of the grease accumulating groove 20 in the axial direction X. Thus, the grease scattered from the first axial direction X-side end of the circumferential wall 30 of the pocket hole 27 is supplied to the grease accumulating groove 20, and accumulated in the grease accumulating groove 20. The grease accumulated in the grease accumulating groove 20 is supplied to a portion between the outer ring raceway surface 15 and the surface of the ball 4.

When the grease filled, it is preferable to apply the grease mainly on the outer circumferential surface of the inner ring 2 facing the inner circumferential surface 29 of the cage 5 in the radial direction Z. According to the embodiment described above, the grease on the outer circumference of the inner ring 2 can be smoothly supplied to the outer ring raceway surface 15 through the circumferential wall 30 of the pocket hole 27 and the grease accumulating groove 20. Therefore, satisfactory grease lubrication between the outer ring raceway surface 15 and the surface of the ball 4 can be provided, and hence the grease lubricated ball bearing for high rotational speed can be provided.

As described above, the interval $W_2$ between the inner circumferential surface of the end 5A of the cage 5 (inner circumferential surface of the protrusion 42) and the outer circumferential surface 43 of the inner ring shoulder portion 12 of the inner ring 2 is set to be narrow. Thus, the grease can be suppressed from passing between the inner circumferential surface of the end 5A of the cage 5 (inner circumferential surface of protrusion 42) and the outer circumferential surface 43 of the inner ring 2 and moving to the space 45 on first axial direction X side (hereinafter referred to as "first axial direction-side space 45") with respect to the cage 5 between the inner and outer rings 2, 3. Thus, the grease can be effectively prevented from accumulating in the first axial direction-side space 45. The amount of grease to be used for the grease lubrication thus can be increased.

Although an embodiment of the present invention has been described above, the present invention can also be implemented in other modes. The above embodiment describes the cage 5 that has the bore diameter $D_1$ on the first axial direction X side smaller than the bore diameter $D_2$ on the second axial direction X side. However, the bore diameter of the cage 5 may be the same between the first axial direction X side and the second axial direction X side.

The above embodiments describes, by way of example, a case in which the inner ring 2 is a rotating member that rotates together with the rotary shaft and the outer ring 3 is a fixed member. However, the invention of the present application can be applied to a case where the outer ring 3 is a rotating member and the inner ring 2 is a fixed member. In addition, various modifications can be made within the scope of the invention.

What is claimed is:

1. A ball bearing comprising:
   an inner ring having an inner ring raceway surface on its outer circumference;
   an outer ring having an outer ring raceway surface on its inner circumference;
   a plurality of balls disposed between the inner and outer ring raceway surfaces; and
   a cage that includes a plurality of pocket holes accommodating the balls, and that is disposed between the inner ring and the outer ring, wherein
   grease is filled between the inner ring and the outer ring
   in the outer circumference of the inner ring, an inner ring shoulder portion is provided on a first axial side of the inner ring and a counter bore is provided on a second axial side of the inner ring, and
   a tapered surface extending outward in a radial direction of the cage toward the ball is formed in a portion that is in an inner circumferential end of a circumferential wall of each pocket hole and that is in an end on a first axial side of the cage.

2. The ball bearing according to claim 1, wherein
   In the cage, a bore diameter on the first axial side is smaller than a bore diameter on a second axial side of the cage.

* * * * *